2,082,764

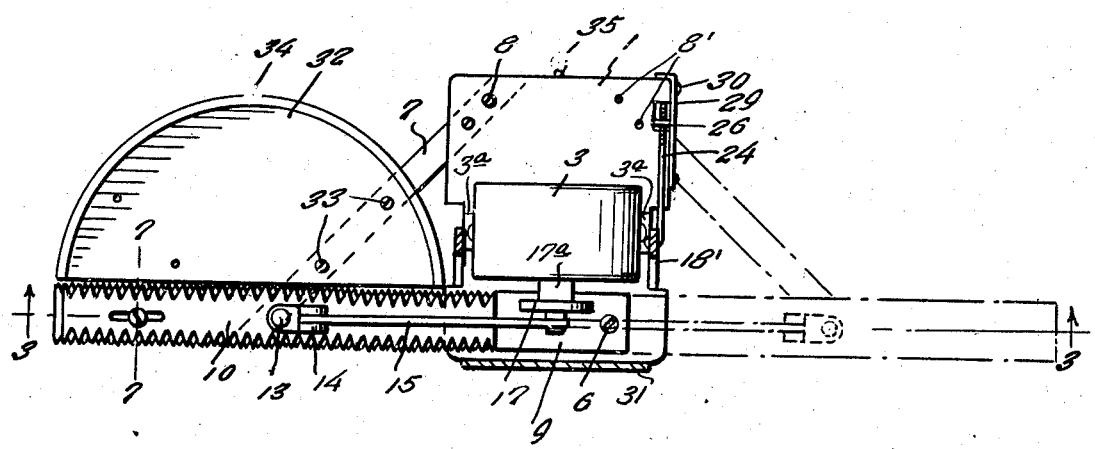
Fig. 2.
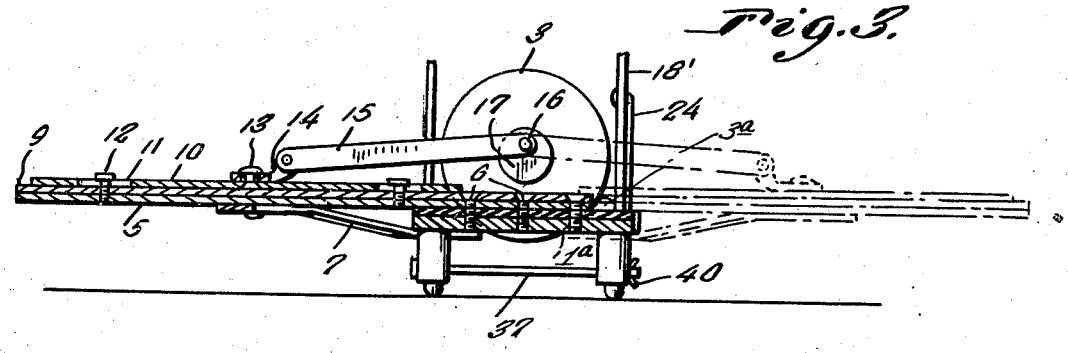
Fig. 3.
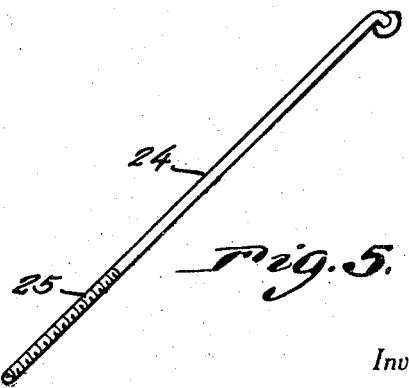
Fig. 4.
Fig. 5.
Inventor
J. M. Hosier
By Clarence A. O'Brien and
Hyman Berman
Attorneys Patented June 1, 1937

UNITED STATES PATENT OFFICE 2,082,764

GRASS TRIMMER

John M. Hosier, Matamoras, Pa., assignor of one-half to Harold M. Young, Wilkes-Barre, Pa.

Application December 18, 1935, Serial No. 55,100

3 Claims. (Cl. 56—25)

This invention relates to a grass trimmer, the present invention being an improvement over that forming the subject matter of an application filed by me on March 15, 1935, Serial No. 11,339.

The object of the present invention is to make the device more efficient than the device forming the subject of the mentioned application, such as making the cutter assembly capable of being placed at either the right side of the platform or the left side thereof, to provide detachable wheels for the platform so that said wheels can be used or not as the operator desires, to provide means for adjustably connecting the handle to the platform and to otherwise increase the efficiency of the apparatus.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a top plan view with the handle in section and the guard removed.

Figure 3 is a section on the line 3—3 of Figure 2.

Figure 4 is a fragmentary edge view showing the means for adjustably connecting the handle to the platform.

Figure 5 is a view of the threaded rod forming part of such means.

Figure 6 is a detail sectional view showing how a wheel guard is connected to the platform.

Figure 7 is a section on the line 7—7 of Figure 2

Figure 1:
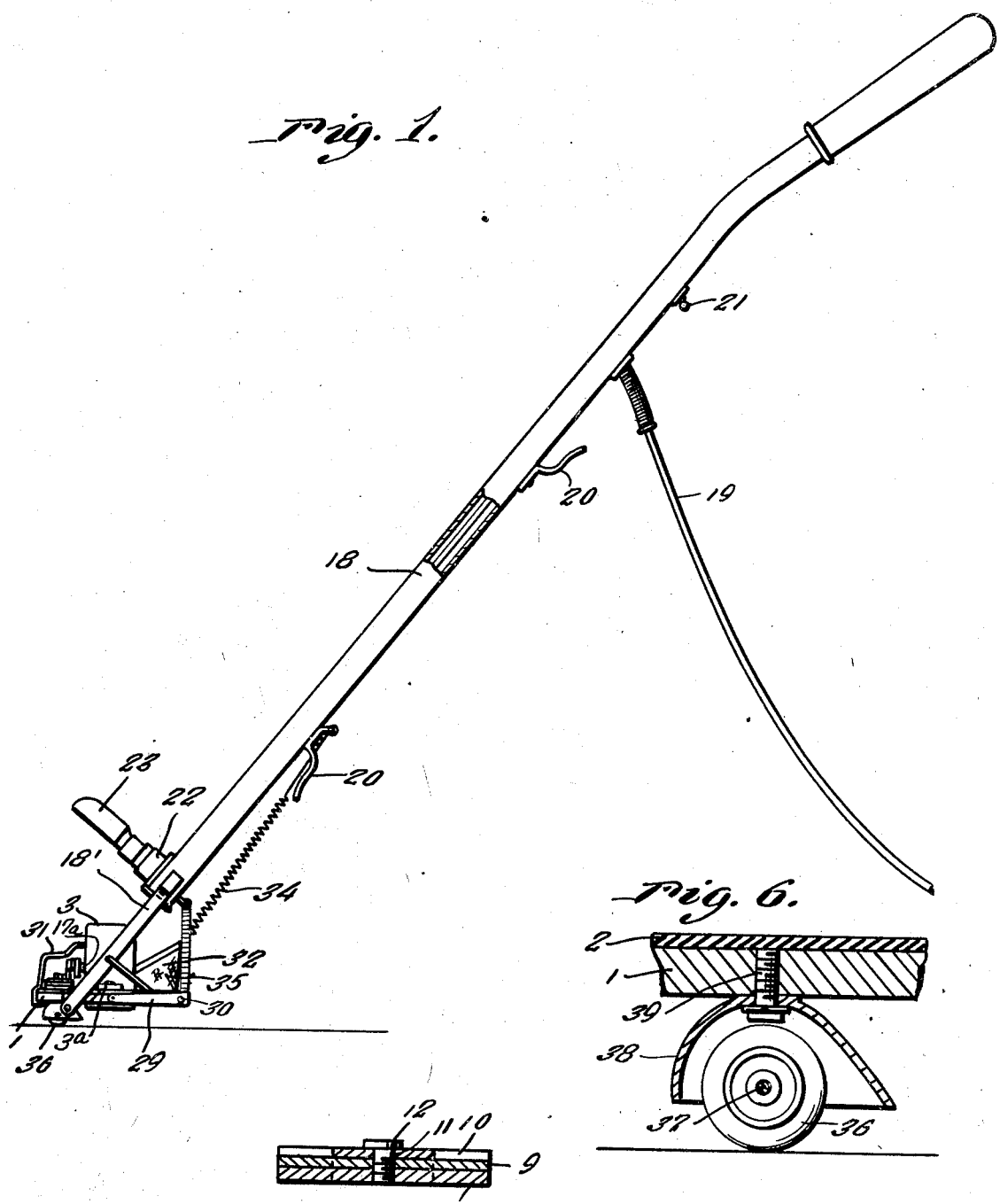
Figure 1 is an elevation of the complete apparatus.

In these drawings the numeral 1 indicates the platform which preferably has a covering 2 of rubber thereon. The platform is provided with an opening 1a to receive a portion of the electric motor 3 which is fastened to the platform in any suitable manner, such as by means of the brackets 3a. An elongated plate 5 is fastened to the front of the platform by the screws or bolts 6 and a diagonal brace 7 extends from an intermediate part of this plate and is connected to the underside thereof, and to a rear corner of the platform to which it is connected by the screws or bolts 8. The stationary cutter member is shown at 9 and rests on this plate 5 and is also held in position by the screws or bolts 6. The reciprocatory cutter plate is shown at 10 and has slots 11 therein through which screws 12 pass into the plates 9 and 5 as shown.

A centrally arranged pivot pin 13 is carried by the cutter plate 10 and pivotally supports a bracket 14 to which the pitman 15 is pivoted, the other end of the pitman being connected by a crank pin 16 eccentrically mounted upon the disk 17 on the shaft 17a of the motor 3. The two cutter plates 9 and 10 have cutting teeth on both edges thereof so that the cutting assembly including the plates 5, 9 and 10 can be turned 180° from the full line position shown in Figures 2 and 3 to the dotted line position shown in said figures. The centrally arranged pivot 13 permits this operation of changing the cutting assembly from one side of the platform to the other without detaching the pitman and the parts are so proportioned that the bolts or screws 6 will hold the parts in either position without changing the position of said bolts or screws. Of course, it is necessary to detach the rear of the brace 7 from the platform and both rear corners of the platform are provided with holes 8' for receiving the screws 8 so that the brace can be connected by said screws to either rear corner of the platform as shown in full and dotted lines in Figure 2.

A tubular handle 18 has a forked lower end 18', the prongs of which are pivoted to the side parts of the platform and the conductors 19 for supplying current to the motor is passed through the hollow handle, the main portions of these conductors leading to a source of supply. Brackets 20 are carried by the handle for permitting the conductors to be wrapped thereabout when the device is not in use and a switch 21 in the handle controls the flow of current to the motor.

A socket 22 for an electric bulb is provided with a reflector 23 and is connected to the lower part of the handle and is suitably connected with the wiring system so as to illuminate the device and the ground adjacent the device for permitting the trimming operation to be carried out at night or in dark places.

The inclination of the handle with respect to the platform can be adjusted through means of a rod 24 pivoted to one of the prongs 18' of the handle and having a threaded part 25 passing through a nut 26 held in a notch 27 in a recess 28 in a side edge of the platform. Thus by adjusting the rod 24 in the notch the inclination of the handle can be changed. The notch and adjacent parts of the rod 24 are normally covered by a latch plate 29 pivoted to the platform and covering the recess 28, the plate 29 having a notch therein receiving a keeper pin 30.

A guard 31 is connected to the front of the platform and covers the motor shaft and the disk and the inner end of the pitman.

A basket 32 may be used for catching the trimmings and this basket can be supported in any suitable manner though the drawings show it as connected by the screws 33 on the brace 7 and a spring 34 has its lower end connected to the rear part of the basket and its upper end to the lower bracket 20 of the handle. A spring 35 connects the rear end of the platform to a part of the handle.

I also provide a pair of wheels 36 on an axle 37 and each wheel is provided with a guard 38 which is detachably connected to the platform by a bolt 39. The axle 37 passes through the guards and may be in the form of a long rod having a head at one end and a cotter pin 40 or the like at its other end for detachably holding the axle in position.

As before stated this device can be used with or without wheels. When used without the wheels it is held by hand and supported so that the bottom of the platform will be above the ground. The handle can be adjusted to cause the device to pass under low hedges or the like and this adjustable handle permits the device to be used in almost any situation without the user having to bend over or assume awkward positions. The reversible cutting mechanism and the centrally arranged pivot for the pitman permits the cutting mechanism to be placed either at the right or left hand side of the platform and the change can be made very easily and quickly.

The device will run on any house current and can be used for trimming grass along walks, under hedges and around any flower garden and under fences and up near foundations of houses and is generally useful in places where an ordinary lawn mower cannot be used. The knife is not only reversible but it can be readily detached for sharpening purposes or be substituted by a new one and the elongated plate 5 with the brace 7 provide means for firmly supporting the knife against vibration.

It is thought from the foregoing description that the advantages and novel features of the invention will be readily apparent.

It is to be understood that changes may be made in the construction and in the combination and arrangement of the several parts provided that such changes fall within the scope of the appended claims.

What is claimed is:—

1. A device of the class described, comprising a platform, an electric motor including a crank member carried by the platform, an elongated narrow plate, means connected with the plate and the platform to detachably support the plate in extended relation on either side of the platform, a stationary cutter member supported on the plate, a second cutter member slidably supported on the first cutter member, each of said cutter members having teeth at each side thereof, a pivot member secured to the slidable cutter member, a bracket rotatably supported by said pivot member, a pitman connected at one end with the bracket and at the other end to the crank member to reciprocate the slidable cutter member, and a handle connected with the platform.

2. A device of the class described, comprising a platform, a motor supported on the platform, an elongated knife supporting plate, detachable means connected with the platform for detachably connecting one end of the plate to the platform, a brace bar extending from an intermediate part of said plate, fastening means on each side of the platform coacting with means on the brace bar for securing the brace bar to either side of the platform, a stationary cutter member supported on the plate, a reciprocatory cutting member supported on the stationary cutting member, means operatively connecting the motor and the reciprocatory cutting member for reciprocating the latter, a handle having a forked lower end pivotally connected with the platform, means carried by the platform and connected with the handle to adjust the inclination of the handle, and wheels detachably connected with the platform.

3. A device of the class described comprising a rubber covered platform, an electric motor secured to the platform, a disk on the motor carrying a crank pin, an elongated plate, a plurality of detachable fastening means connecting one end of the plate to the platform to permit the plate to be supported to extend from either side of the platform, a brace bar extending from an intermediate part of said plate, fastening means on each side of the platform coacting with means on the brace bar for securing the brace bar to either side of the platform, a stationary cutting member located on the plate and held at one end in position by said fastening means, a reciprocatory cutting member slidably mounted on the first cutting member, both of said cutting members having cutting teeth at both sides thereof, a pivot member carried by the reciprocatory cutting member, a bracket on the pivot member, a pitman connecting the bracket with the crank pin, a hollow handle having a forked lower end pivotally connected with the side portions of the platform, means connected to one prong of the forked end and to the platform for adjusting the inclination of the handle with respect to the platform, electrical conductor wires for supplying current to the motor, said conductor wires passing through the handle, and a switch on the handle for controlling the electric current.

JOHN M. HOSIER.